INVENTOR:
James Y. Payton
By Seymour A. Scholnick
Attorney

NONDESTRUCTIVE TUNNEL DIODE MEMORY SYSTEM

Filed April 29, 1963

INVENTOR:
James Y. Payton

By Seymour A. Schelnick
Attorney

INVENTOR.
James Y. Payton
By Seymour A. Scholnick
Attorney

INVENTOR:
James Y. Payton
By Seymour A. Scholnick
Attorney

INVENTOR:
James Y. Payton
By Seymour A. Scholnick
Attorney

INVENTOR:
James Y. Payton
By Seymour A. Scholnick
Attorney

United States Patent Office 3,425,040
Patented Jan. 28, 1969

3,425,040
NONDESTRUCTIVE TUNNEL DIODE MEMORY SYSTEM

James Y. Payton, Woodland Hills, Calif., assignor to Litton Systems, Inc., Beverly Hills, Calif.
Filed Apr. 29, 1963, Ser. No. 276,342
U.S. Cl. 340—173 11 Claims
Int. Cl. G11b *9/00*

The present invention relates to a tunnel diode digital computer memory system and, more particularly, to an improved random access, nondestructive, tunnel diode memory system having a multimegacycle data handling capability and which directly and reliably produces a relatively large amplitude memory element response signal that is readily distinguishable from accompanying noise signals.

Within the field of digital computer development there has been a requirement for devices or techniques by which information can be stored or retrieved on command at the ever increasing pace set by digital computer logic circuits. Various memory techniques employing, for example, magnetic cores and thin films have been used to meet this requirement for different digital computers and applications. However, due to the hysteresis losses of the individual ferrite cores at operating frequencies greater than 500 kilocycles, magnetic core memories were found to require excessive amounts of operating power. Also, problems have arisen in the use of magnetic thin film memories in that, while characterized by operating frequencies approaching five megacycles, they have been also characterized by the difficulties in reading information nondestructively at high speeds out of a magnetic thin film.

More recently, the inherently fast switching speeds of tunnel diodes have inspired developments of memory systems utilizing tunnel diodes as the data storage elements. Prior art tunnel diode nondestructive memory systems have been claimed to demonstrate operating frequencies from 500 kilocycles to five megacycles at relatively low levels of power consumption. One such high speed prior art tunnel diode memory system has been described by Shigeru Takashashi and Osamu Ishii of the Electrotechnical Laboratory, Tokyo, Japan, in the Oct. 20, 1961, issue of Electronics Magazine, pages 66 through 68. The approach used by Takahashi et al., however, places extremely stringent restrictions on characteristics of the tunnel diodes utilized, requires that matched components be used, and, because of the low voltage levels maintained within the memory system, requires the addition of more sensitive and complex read and write circuitry for controlling the operating voltage of the memory element tunnel diode.

More particularly, in the Takahashi et al. prior art tunnel diode memory system, the writing of a binary "1" or "0" digit into a tunnel diode for storage therein is accomplished by selectively applying, from a low impedance source, either 0.6 or 0 volt, respectively, across a series combination of a tunnel diode and an associated conventional semiconductor diode, the latter being used for isolation purposes. The application of one or the other of these write voltages across the series combination of tunnel diode and isolation diode operates to set the tunnel diode to either its high or low voltage state of operation, respectively. In a succeeding read operation, a read voltage pulse is applied to the tunnel diode end of said series combination of tunnel diode and isolation diode of such magnitude that the conducting or nonconducting state of the isolation diode, during the read operation, is determined by the stored voltage state of the tunnel diode. In this regard, when the tunnel diode has been set to its high voltage state, signifying that the tunnel diode is storing a binary "1" digit therein, the associated isolation diode is rendered non-conductive to a read voltage pulse applied, during a subsequent read operation, to said series combination of tunnel diode and isolation diode. Conversely, if the tunnel diode has been set to its low voltage state, thereby signifying the storage of a binary "0" digit therein, during a subsequent read operation, the associated isolation diode is switched to its conducting state. To determine and present outside the memory system, during the read operation, whether a binary "1" or "0" digit had been previously stored in the tunnel diode, an output voltage pulse appearing, in response to the applied read voltage pulse, at the isolation diode end of said series combination of tunnel diode and isolation diode is sensed and amplified. However, the output voltage at the isolation diode end of said series combination changes very little whether a binary "1" or a binary "0" digit is sensed for the reason that, in this technique of reading the information from the tunnel diode, the voltage shift of the isolation diode tends to cancel or mask the voltage appearing across the tunnel diode. Thus, in operation, only extremely small output pulses are selectively produced in accordance with the conducting or non-conducting state of the isolation diode, representing a stored binary "0" or "1" digit, respectively (the difference between the two output pulse levels being on the order of 50 millivolts). Moreover, the magnitude of these extremely small output voltage pulses are comparable with that of noise and pickup signals appearing on the output digit lines. It is, therefore, necessary to use an extremely sensitive and complex differential amplifier for the amplification and presentation of the output pulses thus produced.

Further, even small component variations in the prior art tunnel diode memory system could result in the loss of reliability of detecting the exact information that was introduced to the memory system for storage therein. Thus, while the Takahashi et al. memory system demonstrates memory speed greater than one megacycle, the memory approach has generally put extremely tight restrictions on the characteristics of the tunnel diodes employed and other components, and the method of reading the information from the memory elements has necessitated the addition of the complex amplifier circuitry which is still inadequate to reliably distinguish between the two binary output signals and random noise.

The present invention, on the other hand, provides a high frequency, nondestructive, random access memory system which obviates the above and other disadvantages of the prior art devices by employing a unique combination of tunnel diode memory element and read circuit wherein the operating voltage state of the memory element's tunnel diode is directly determinable by the read circuit and, in contrast to the prior art tunnel diode memory system, the associated isolation diode of the memory element, during the read operation, is maintained conductive irrespective of the operating voltage state of its associated tunnel diode and, in consequence, relatively large magnitude, reliable, output signals are obtained that are readily distinguishable from noise and line pickup. Moreover, a circuit approach that permits a predetermined group of memory elements in the memory system to be cleared of previously stored information and new information written into the individual memory elements of the group simultaneously may be employed in the memory system of the present invention, thereby considerably reducing the write-clear time of the memory system cycle of operation. In addition, the memory circuit of the invention can tolerate relatively large variations in tunnel diode parameters together with relatively large voltage and resistor mutations.

According to one embodiment of the present invention, the memory system includes a plurality of tunnel diode memory elements, each memory element comprising a semiconductor tunnel diode, a semiconductor isolation diode, and a resistor. The memory system of the present invention further provides the combination of the memory element and a read circuit wherein the operating state of the memory element's tunnel diode is directly determinable by the read circuit. For example, during the read operation, a word select circuit places a first electrode of a tunnel diode, in which the desired information is stored, at effectively ground potential. Subsequently, the read circuit receives a read command signal that causes the read circuit to apply, through the preselected memory element, a positive read current whose magnitude is great enough so that both the isolation diode and the associated, serially connected tunnel diode are uniformly rendered strongly conductive independent of the operating voltage state of the tunnel diode. Accordingly, an output voltage signal is thereby produced across the memory element which substantially follows and corresponds to the operating voltage state of the tunnel diode (although having a small offset or bias due to the voltage drop across the isolation diode). This output voltage signal, whether it follows and corresponds to the high or the low voltage state of the tunnel diode representing a binary "1" or "0" digit, respectively, stored therein, is reliably recognizable by a simply mechanized read amplifier to which it is applied. A considerably higher potential level output signal is presented, during the read operation, to the read amplifier when the selected tunnel diode is operating in its high voltage state than during the tunnel diode's low voltage state of operation, this potential difference being greater than 350 millivolts and approximately seven times as great a potential difference as in the memory element output signal of the prior art tunnel diode memory. As a consequence, the two operating voltage states of the memory elements' tunnel diodes are readily distinguishable from one another and from random noise by simply mechanized, single stage amplifiers.

To substantially eliminate the residual effects of the isolation diode voltage swing on the voltage drop across the tunnel diode, the output read amplifier includes a correction diode input circuit, coupling the isolation diode to the main body of the amplifier, which compensates for the voltage swing of the isolation diode so that effectively only the unaltered operating voltage state of the tunnel diode is sensed by the output read amplifier during the read operation. More particularly, the correction diode circuit is connected in such a manner that the forward drop across the correction diode complements the displacement of the tunnel diode voltage level by the conducting isolation diode. If, for example, the tunnel diode and isolation diode have a voltage rise thereacross, the correction diode circuit is connected so that the forward drop across the correction diode subtracts from the voltage magnitude across the series combination of tunnel diode and isolation diode leaving substantially that voltage which would appear directly across the tunnel diode alone. In a similar manner, if the isolation diode has a voltage drop thereacross, the correction diode is connected so that its forward drop adds to the voltage magnitude across the series combination of tunnel diode and isolation diode, thereby substantially restoring that part of the voltage appearing across the tunnel diode which was lost to the voltage drop across the isolation diode. As is apparent from the above description of the correction circuit, the isolation diodes and correction diodes should, preferably, have like conduction characteristics.

The present invention further provides a circuit means for writing binary information into the tunnel diode memory element, the writing circuit including a source of substantially constant current, the magnitude of which exceeds the peak current rating of the tunnel diode. The writing apparatus of the present invention permits greater flexibility in tunnel diode static and operating parameters and provides means for applying a fixed predetermined current to the tunnel diode, independent of their variations in electrical characteristics, for setting them to the high voltage state of operation.

In accordance with another concept of the present invention, the addressing of memory locations for both read and write operations can be accomplished with a two-dimensional line or word selection technique. By factoring the memory array in this manner, the number of circuits required for address decoding can be minimized.

It is therefore an object of the present invention to provide a random access, tunnel diode memory system in which the operating voltage states of its tunnel diode memory elements are reliably and readily distinguishable during a read operation.

It is another object of the present invention to provide a random access, tunnel diode memory system capable of multimegacycle operation with relatively low power dissipation.

It is still another object of the present invention to provide a random access nondestructive tunnel diode memory system wherein the voltage states of the individual memory element tunnel diodes are directly sensed and transmitted substantially unchanged to the output circuitry.

It is a still further object of the present invention to provide a tunnel diode memory system wherein the isolation diode of a selected tunnel diode memory element, during the read operation, is maintained strongly conductive independent of the operating voltage state of its associated tunnel diode.

It is a still further object of the present invention to provide, in a tunnel diode memory system, a voltage correction circuit for correcting the voltage levels of a displaced tunnel diode output signal and applying that corrected signal as an input signal to a readout amplifier.

It is yet another object of the present invention to provide, in a random access, tunnel diode memory system, a simply mechanized write circuit which applies a predetermined substantially constant current to a selected memory element for setting the tunnel diode of said memory element to its high voltage state of operation.

It is still another object of the present invention to provide a tunnel diode memory system which is substantially insensitive to relatively large variations in component parameters and one in which voltage transients will have little effect.

The novel features which are believed to be characteristic of the present invention, both as to its organization and method of operation, together with further objects and advantages thereof, will be better understood from the following description considered in connection with the accompanying drawings in which one embodiment of the invention is illustrated by way of example. It is to be expressely understood, however, that the drawings are for the purpose of illustration and description only and are not intended as a definition of the limits of the invention.

FIGURE 1 is a circuit diagram illustrating one embodiment of a single digit tunnel diode memory system according to the present invention.

FIGURE 2*a* is a graph illustrating, by way of example, the conduction characteristic of a semiconductor tunnel diode rectifier which may be utilized in the tunnel diode memory system of the present invention.

FIGURE 2*b* is a graph illustrating, for purposes of convenient reference and comparison, the conduction characteristics of two semiconductor diode rectifiers which may be utilized as an isolation diode and a correction diode, respectively, in preferred embodiments of the present invention;

FIGURE 3 is a circuit diagram illustrating a tunnel diode memory system of the present invention for storing therein two data words each comprising two binary digits.

FIGURE 4 comprises waveform charts wherein are displayed, on a common time scale, the waveforms of various signals, A through K respectively, as they would appear during the operation of the tunnel diode memory system illustrated in FIGURE 1 or 3.

Figure 1:
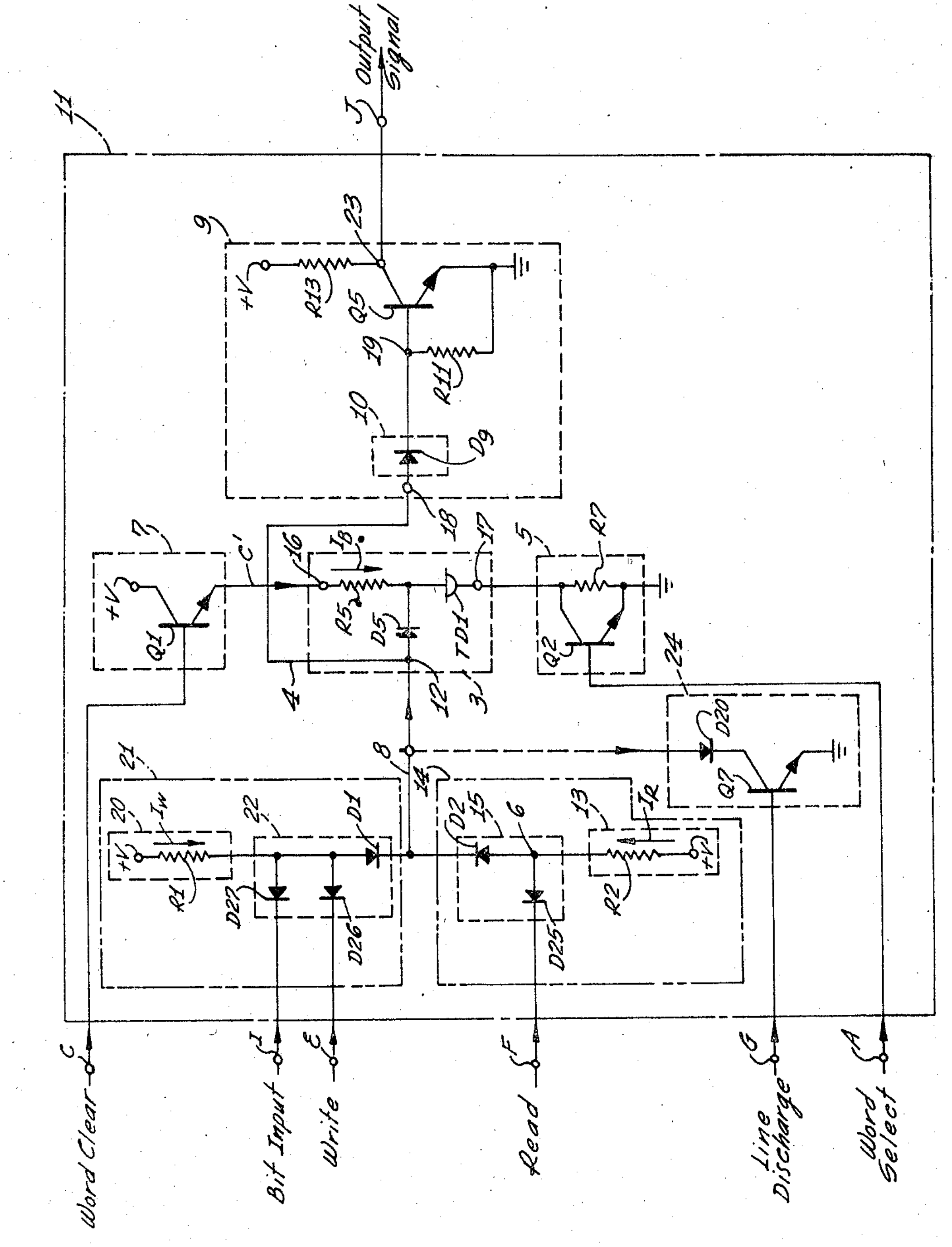

Referring now to the drawings wherein like reference characters represent like or corresponding parts throughout the several views (and wherein FIGURE 2*a* and the waveforms of FIGURE 4 will be considered in conjunction with the descriptions of FIGURES 1 and 3), there is shown in FIGURE 1 a circuit diagram of a nondestructive tunnel diode memory system 11 which embodies the cardinal principles of the present invention. Memory system 11 includes a memory element 3 employing a tunnel diode TD1 for storing a binary digit therein, the tunnel diode being capable of being set to a low or a high operating voltage state by changing the bias on said tunnel diode, the low or high operating voltage state of the tunnel diode ordinarily designating a binary "0" or "1" digit, respectively.

More particularly, following the actuation of a word select circuit 5 and a word clear circuit 7 of memory system 11, a bilevel bit input signal I having a high or a low level representing a binary "1" or "0" digit value, respectively, is applied to a write circuit 21 that operates, in response to an applied bilevel write command signal E at its high level and in accordance with the "1" or "0" binary value of bit input signal I at the time of application, to apply or not to apply, respectively, a predetermined substantially constant write current $I_W$ over a conductor 8 to memory element 3 for thereby setting tunnel diode TD1 to its respective high or low voltage state of operation. As is further shown in FIGURE 1, memory system 11 includes a read circuit 14 to which is applied a bilevel read command signal F, at its high level, for causing a read current $I_R$ to flow from read circuit 14 through conductor 8 to memory element 3. Assuming, for purposes of example, that word select circuit 5 has been actuated prior to the application of read command signal F, memory element 13 conducts read current $I_R$ therethrough and an output read amplifier 9 senses the memory element's response to read current $I_R$, read amplifier 9 producing or not producing an output pulse in accordance with a sensed memory element high or low voltage level response, respectively, the memory element's high or low voltage level response corresponding to a respective binary "1" or "0" digit value stored therein.

A line discharge circuit 24 is included in memory system 11, as shown in FIGURE 1. A discharge circuit of this type may be utilized in large memory systems of the present invention to overcome disruptive effects of stray capacitance in such memory systems by discharging spurious capacitance before the word select circuits are actuated (normally the term large memory system means one employed in a digitial computer wherein the memory is expected to store many data words each having numerous binary digits therein).

As illustrated in FIGURE 1, memory element 3 of the present invention comprises a semiconductor tunnel diode TD1, a resistor R5, and a semiconductor isolation diode D5. A cathode electrode of tunnel diode TD1 is connected to a memory element terminal 17, terminal 17 having word select circuit 5 connected thereto. Resistor R5 interconnects a memory element terminal 16, having word clear circuit 7 connected thereto, and an anode electrode of tunnel diode TD1, resistor R5 providing and determining, in cooperation with a voltage maintained between word clear circuit 7 and word select circuit 5, a tunnel diode bias current $I_B$. The read and write operations, whereby the voltage state of tunnel diode TD1 is sensed and altered, respectively, are performed by the application of the respective currents to an anode electrode of isolation diode D5, the isolation diode having its anode electrode connected to a memory element terminal 12 and its cathode electrode connected to the common junction of resistor R5 and tunnel diode TD1.

Referring now with particularity to the other basic circuits of memory system 11 and their interrelations, the circuits being hereinbefore named, it is shown in FIGURE 1 that word select circuit 5 normally interconnects terminal 17 of memory element 3 and a source of ground potential. Word select circuit 5 includes a transistor Q2 having a base, a collector, and an emitter electrode and has its collector electrode connected to terminal 17 while its emitter electrode is connected to the source of ground potential, the collector and emitter electrodes having a shunt resistor R7 connected therebetween. When a read or write operation is not being performed by the memory system, this condition being hereinafter sometimes referred to as the static state of operation, terminal 17 of memory element 3 is normally connected to the source of ground potential through resistor R7. Memory element 3 is ordinarily isolated from a subsequently applied write current $I_W$ or a read current $I_R$ by diode D5 of the memory element, the voltage drop across resistor R7 of word select circuit 5 being sufficient to bias diode D5 such that the currents will not pass therethrough.

However, memory element 3 and, more particularly, tunnel diode TD1 is made responsive to the application of a write or a read signal by the actuation of word select circuit 5. When either the write or the read operation is to be performed on memory element 3, a bilevel word select command signal A, at its high level, is applied to the base electrode of transistor Q2, thereby driving the transistor into its saturated state of operation and pulling terminal 17 to ground potential.

In accordance with the present invention, as shown in FIGURE 1, write circuit 21 comprises a source 20 of predetermined substantially constant current including a resistor R1 and a source of substantially constant potential +V, write circuit 21 also comprising a gating circuit 22 including semiconductor diodes D1, D26, and D27. Gating circuit 22 is responsive to the application of write command signal E at its high level, applied to the cathode electrode of diode D26, diode D26 having its anode electrode connected to the anode electrodes of diodes D1 and D27, for applying or not applying the substantially constant write current $I_W$ to memory element 3, in accordance with the binary value of bivalued bit input signal I which is applied to the cathode electrode of diode D27. Write current $I_W$ is generated by the serially connected combination of resistor R1 and the source of predetermined substantially contant voltage +V and is of such a magnitude that when bit input signal I, write command signal E, and word select signal A are all at their high level, write current $I_W$ will flow through gating circuit 22, conductor 8, and memory element 3 and will set the tunnel diode contained therein to its high voltage state of operation. It should be pointed out, that the cathode electrode of diode D1 is connected to terminal 12 of memory element 3, diode D1 isolating the write circuit from other pulses applied during the memory system operation.

Continuing with the discussion of the invention, word clear circuit 7 includes a transistor Q1 having a base, a collector, and an emitter electrode, its collector electrode being connected to a source of predetermined substantially constant voltage +V while its emitter electrode is connected to terminal 16 of the memory element. A bilevel word command signal C is applied, at its high level, to the base electrode of transistor Q1 for driving transistor Q1 into its saturated state of operation, thereby placing terminal 16 of memory element 3 substantially at a potential level equal to the predetermined voltage +V.

As pointed out above, when the operating voltage state of tunnel diode TD1 in memory element 3 is to be sensed and a signal corresponding thereto produced as an output signal of the memory system, read circuit 14, in cooperation with word select circuit 5, samples the operating voltage state of tunnel diode TD1 by applying read current $I_R$ therethrough. Memory element 3 responds to the application of this read current by producing a voltage response signal at terminal 12 of memory element 3 corresponding to and following the high or low operating voltage across tunnel diode TD1 slightly displaced by an amount equal to the voltage drop across forward conducting isolation diode D5. The voltage signal appearing at terminal 12 is sensed by output read amplifier 9, output amplifier 9 compensating for the aforementioned voltage displacement across diode D5 and producing an output signal in representation of the operating voltage state of tunnel diode TD1. Within read circuit 14 is included a second source 13 of predetermined substantially constant current comprising a resistor R2 and a source of substantially constant voltage +V, read circuit 14 also comprising a diode gating circuit 15 employing semiconductor diodes D25 and D2. Resistor R2 interconnects the source of substantially constant voltage +V and a common junction terminal 6 to which is connected the anode electrodes of diodes D2 and D25, the cathode electrode of diode D2 being connected to terminal 12 of memory element 3. Gating circuit 15, in response to a bilevel read command signal F at its high level, is operable for applying read current $I_R$ to memory element 3. Read current $I_R$ is generated by the serially connected combination of resistor R2 and the source of substantially constant voltage +V of circuit 13, and is of such a magnitude that, when applied to memory element 3 at terminal 12, it conductively biases diode 5 of memory element 3 independent of the operating voltage state of tunnel diode TD1. By actuating word select circuit 5, thereby placing terminal 17 of memory element 3 effectively at ground potential, just prior to the application of read command signal F at its high level, it is insured that the voltage response signal of memory element 3 present at terminal 12 will be substantially that voltage appearing across the tunnel diode TD1 displaced only by the voltage drop across forward conducting isolation diode D5.

Accordingly, the voltage response signal present at terminal 12 is transmitted through a conductor 4 to a terminal 18 of read amplifier 9, the read amplifier having an input voltage correction circuit 10 which compensates for the voltage displacement due to diode D5 of memory element 3 so as to present to a terminal 19, within the read amplifier, essentially the unaltered operating voltage state of memory element tunnel diode TD1. Voltage correction circuit 10 comprises a semiconductor correction diode D9 that intercouples terminals 18 and 19, the correction diode having identical poling with respect to terminal 12 of memory element 3 as does isolation diode D5 of memory element 3. The remainder of output read amplifier 9 is a conventional, single stage, transistor amplifier employing a transistor Q5 and a pair of resistors R11 and R13 as a bias and a load resistor, respectively. A bilevel output signal J is produced at a terminal 23 connected to the collector electrode of transistor Q5, output signal J corresponding to the sensed operating voltage state of tunnel diode TD1 during the read operation.

As was hereinbefore stated, line discharge circuit 24 may be used in tunnel diode memories of the present invention where a large number of memory elements are employed in the memory system for the storage of many digital data words, each word having numerous binary digits therein. Accordingly, line discharge circuit 24 includes a semiconductor diode D20 and a transistor Q7, diode D20 having its anode electrode coupled to terminal 12 of memory element 3 while its cathode electrode is coupled to the collector electrode transistor Q7 whose emitter electrode is coupled to a source of ground potential. Line discharge circuit 24 is operable, in response to a bilevel line discharge command signal G at its high level, applied to the base electrode of transistor Q7, for shunting during relatively short periods of time, stray capacitive charges present on conductor 4 to ground potential.

Before proceeding further with a description of the operation of a tunnel diode memory system of the present invention, it is advantageous to discuss the nomenclature relating to a tunnel diode and the normal operating characteristics of a tunnel diode as employed in the memory elements of the present memory system. In this regard, attention is directed to FIGURE 2*a*, wherein is shown a representative tunnel diode current-voltage characteristic conduction curve whereon have been superimposed four load lines, 30, 33, 35 and 37, that represent four operating conditions which may be established in any basic memory element of the present invention when memory system 11 is operating, the four conditions being clear, hold, read and write, respectively.

Figure 2A:
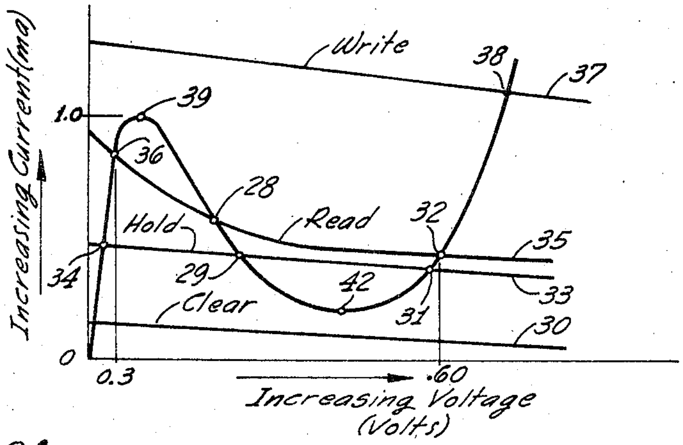

In the art relating to semiconductor tunnel diodes, it is generally understood that the term "tunnel diode peak current" is used to denote that magnitude of current that is flowing through the tunnel diode when, with increasing voltage, the impedance characteristic of the tunnel diode changes from a positive to a negative value, as illustrated by the slope of its characteristic curve changing from positive to negative. This point of change and low voltage limit of the negative impedance characteristic is illustrated in FIGURE 2*a* as a point 39 on the characteristic curve. The "tunnel diode valley current," on the other hand, is a term used to denote a magnitude of current that is flowing through the tunnel diode when, with an increasing voltage higher in magnitude than at the peak current point, the impedance characteristic of the tunnel diode changes from the negative to a positive value, as illustrated by the slope of its characteristic curve changing from negative to positive, increasing voltages applied across the tunnel diode greater than the voltage magnitude at the valley current point having concomitantly increasing currents. The valley current point of change and high voltage limit of the negative impedance characteristic is shown as a point 42 on the characteristic curve in FIGURE 2*a*. Those skilled in the art will understand that the voltages across the semiconductor junction of the tunnel diode, corresponding to the peak and valley currents, can be considered fixed for a particular type of semiconductor material used in the diode. Moreover, the characteristic curve suggests that two stable operating states may be maintained in a tunnel diode. In this connection, for applied currents less than the minimum tunnel diode valley current, represented by point 42 in FIGURE 2*a*, only one stable state may be maintained, that of the low voltage operating state. Above the tunnel diode valley current but less than the tunnel diode peak current magnitude, represented by point 39 in FIGURE 2*a*, three operating states of the tunnel diode can occur, but only two of these are stable. More particularly, in the region just described, the tunnel diode may only operate with stability in a low or a high voltage state, while, for applied current magnitudes greater than the tunnel diode peak current, only the high voltage operating state may exist in the tunnel diode. In the present invention, this bistable characteristic is employed by assigning two corresponding values of a binary variable to the high and low voltage operating states, and providing means for changing the operating condition from one stable state to the other. Specifically, setting the tunnel diode to its low voltage state of operation, this setting operation commonly being referred to as the clear mode, merely necessitates that the current flowing therethrough be decreased below the tunnel diode valley current magnitude. The setting of the tunnel diode to its high voltage state of operation, on the other hand, this setting operation on the tunnel diode being referred to as the write mode, requires the application of an amount of current exceeding the tunnel diode peak current magnitude. When the tunnel diode has been set to its high or low operating voltage state, a current greater than the valley current but not exceeding the peak current may be applied to the tunnel diode to hold the high or low operating voltage state. As long as the magnitude of holding current remains within the limits set hereinabove, the tunnel diode will reliably hold its set operating voltage state, and this holding operation is referred to as the hold mode. The read mode of operation takes place when a read current, also having a magnitude greater than the valley current but less than the peak current magnitude, is applied to the tunnel diode and the tunnel diode's voltage response to the read current sensed by amplifier means. Reliable and nondestructive detection of the tunnel diode's voltage response is accomplished by the operation of the circuitry hereinbefore described.

Figure 2B:
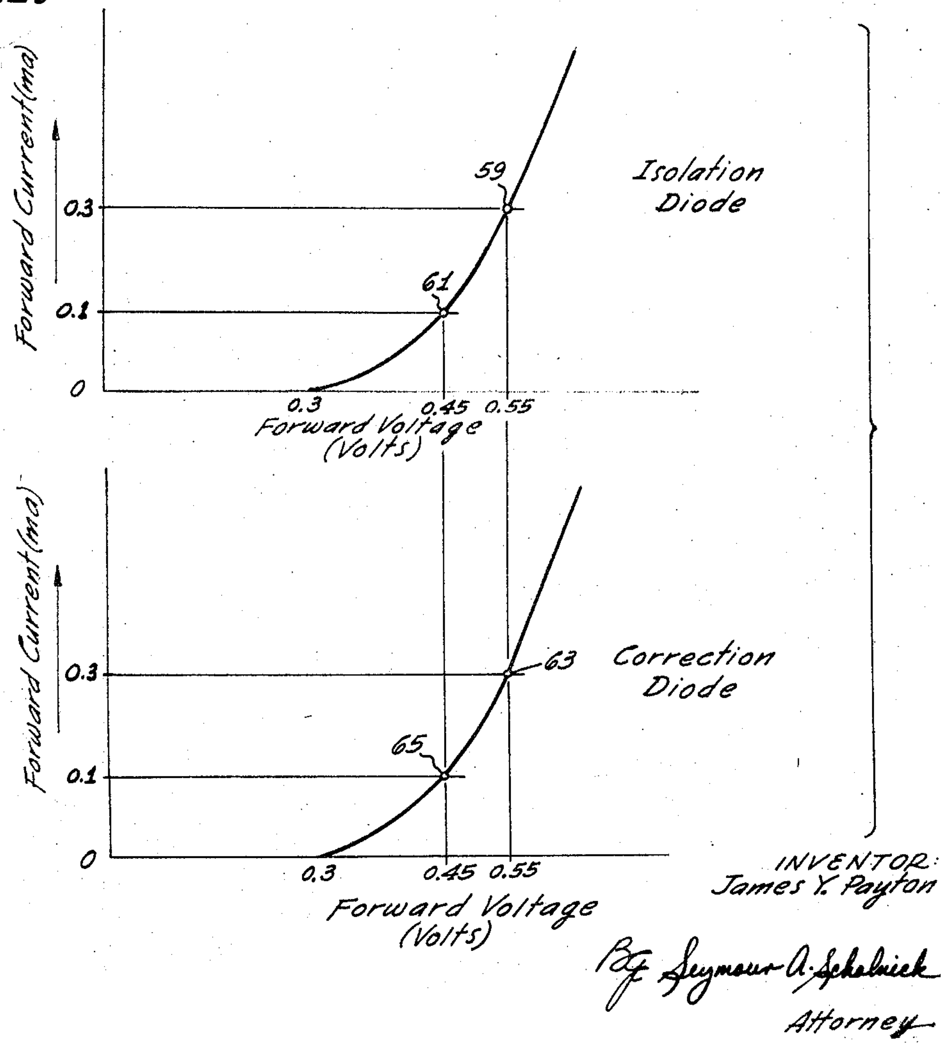

Referring now to FIGURE 2*b*, wherein is illustrated a pair of conduction characteristic curves for two semiconductor diode rectifiers that may be utilized as isolation diode D5 and correction diode D9 in preferred embodiments of the present invention, it is shown in FIGURE 2*b* that the like forward conduction characteristics of the two diodes are characterized by a sharp transition between very low conductivity and high conductivity at a predetermined conduction voltage (+.3 volt, for example). This point of transition is commonly known as the cutoff point. Further, the diodes described by these curves usually exhibit a very low dynamic resistance when a voltage equal to or in excess of the conduction voltage is applied across the diodes in their forward direction. At voltages below the conduction voltage such diodes are essentially nonconductive. Therefore, as will be later discussed in connection with a description of the memory system read operation, since the conduction voltage of correction diode D9 is substantially equal to the conduction voltage of isolation diode D5, the voltage rise across diode D5 in response to an applied current is largely compensated for by the voltage drop across correction diode circuit 10. Those skilled in the art will readily understand that the residual component of forward drop, caused by the application of read current $I_R$ in memory systems of the present invention, will be largely compensated for by limiting the applied read current to a predetermined range in which the forward conduction characteristic of diodes D5 and D9 have such a steep slope that very little variation in forward voltage occurs between them.

Comparing the operating modes of tunnel diode TD1, illustrated on its forward conduction characteristic curve of FIGURE 2*a*, and the operating voltages of diodes D5 and D9, as shown on their respective conduction curves of FIGURE 2*b*, it should be noted that when tunnel diode TD1 is operating during a read mode of operation in its low voltage state, this state being graphically indicated on its characteristic conduction curve as a point 36 on read load line 35, the operation of its associated isolation diode is characterized by the passage therethrough of a substantial amount of read current $I_R$, this operating current magnitude being the current coordinate value for locating a point 59 on the isolation diode conduction curve. Accordingly, when isolation diode D5 is conducting said substantial portion of current $I_R$, correction diode D9 conducts a proportionately smaller magnitude of read current $I_R$, as indicated by the location of a point 65 on its forward conduction characteristic curve of FIGURE 2*b*. Conversely, when tunnel diode TD1 is operating in its high voltage state during a read mode of operation, such an operating state being illustrated as a point 32 on its characteristic conduction curve, isolation diode D5, while still forward conducting passes therethrough a lesser amount of read current $I_R$ than when the tunnel diode was operating in its low voltage state, this current magnitude graphically locating a point 61 on the isolation diode characteristic curve. Consequently, correction diode D9 conducts the concomitant substantial portion of read current $I_R$, the current magnitude defining a point 63 on its characteristic conduction curve.

While the terms "substantial proportion of read current $I_R$" and "proportionately smaller" or "lesser amount of read current $I_R$" are used in defining the operating conduction states of the isolation diode and the correction diode, the two operating points have a considerably closer voltage relationship. By conductively biasing the diodes independent of the tunnel diode operating voltage state, the two conduction states of both the isolation and correction diode are maintained well above their respective cutoff voltages and, for each diode, one conduction state is normally no more than a few millivolts greater than the other.

It should further be noted, in connection with FIGURE 1, that correction diode D9 is in a so called back-to-back relationship with diode D5—that is, like terminals (anode-to-anode or cathode-to-cathode) of the diode rectifiers are coupled together at the common junction terminal 12. It is clear, in view of the foregoing explanation, that the principal component of forward drop across both the isolation diode and the correction diode will be the conduction voltage of the diodes. Those skilled in the art will understand, however, that the voltage drop through the diodes may in actuality deviate to some extent from the conduction voltage of the diodes because of the voltage contribution made by current flowing through said diodes. However, for purposes of simplicity in considering the operation of memory system 11, forward drop through the isolation diode and correction diode will be treated as being equal to their principal component, that is the conduction voltage of the diodes.

In operation, the interconnection of the isolation diode and the correction diode is such as to cause the voltage drop across the correction diode to complement the voltage displacement of the tunnel diode voltage signal by the conducting isolation diode voltage drop. For example, if the tunnel diode and isolation diode have a voltage rise thereacross, the correction diode would be connected so that the forward drop across the correction diode subtracts from the voltage magnitude across the series combination of tunnel diode and isolation diode leaving substantially that voltage magnitude which would appear directly across the tunnel diode alone. On the other hand, assuming the isolation diode voltage drop subtracts from the voltage appearing across the tunnel diode alone, the correction diode is connected such that its forward drop adds to the voltage magnitude appearing across the series combination of tunnel diode and isolation diode, thereby substantially restoring that part of the voltage appearing across the tunnel diode alone which was lost to the voltage drop across the isolation diode. Thus, a voltage response signal corresponding to and substantially following the high or low operating voltage state of the tunnel diode but slightly diminished by the voltage drop across isolation diode D5, independent of the operating voltage state of the tunnel diode, will be substantially restored to a magnitude approximately the same as if the tunnel diode's operating state had been directly sensed by obtaining the voltage response signal across the tunnel diode alone.

The memory system of the present invention, as hereinbefore mentioned, has four normal operating modes. More particularly, when the memory system is operating, the conventional sequence of operation that will be followed hereinbelow begins with the hold mode, the hold mode maintaining whatever tunnel diode operating voltage state is present in the memory system when hold mode is initiated, the hold mode being followed by a clear mode of operation during which the tunnel diode of the memory element is uniformly set to a low voltage state of operation. Occurring simultaneously with the clear mode is a write mode of operation for setting the tunnel diode of the memory element to its high or low operating voltage state in accordance with a binary "1" or "0" digit value to be stored therein. A hold mode follows the write operation to maintain the set condition of the memory element tunnel diode. Overlapping the latter hold mode or subsequently there following, occurs a read mode of operation during which the operating voltage state of the memory element tunnel diode is sampled and sensed and a bilevel output signal produced corresponding to the sensed tunnel diode operating voltage state.

In considering the overall operation of memory system 11 with particular reference to FIGURE 1, let it be assumed for purposes of example that the memory system is made initially operable by applying all the predetermined potentials +V to the various circuits of the memory system. Since all currents flowing within the memory system had been reduced to zero during the off state, tunnel diode TD1 is operating in its low voltage state when the memory system is made operable.

Figure 4:
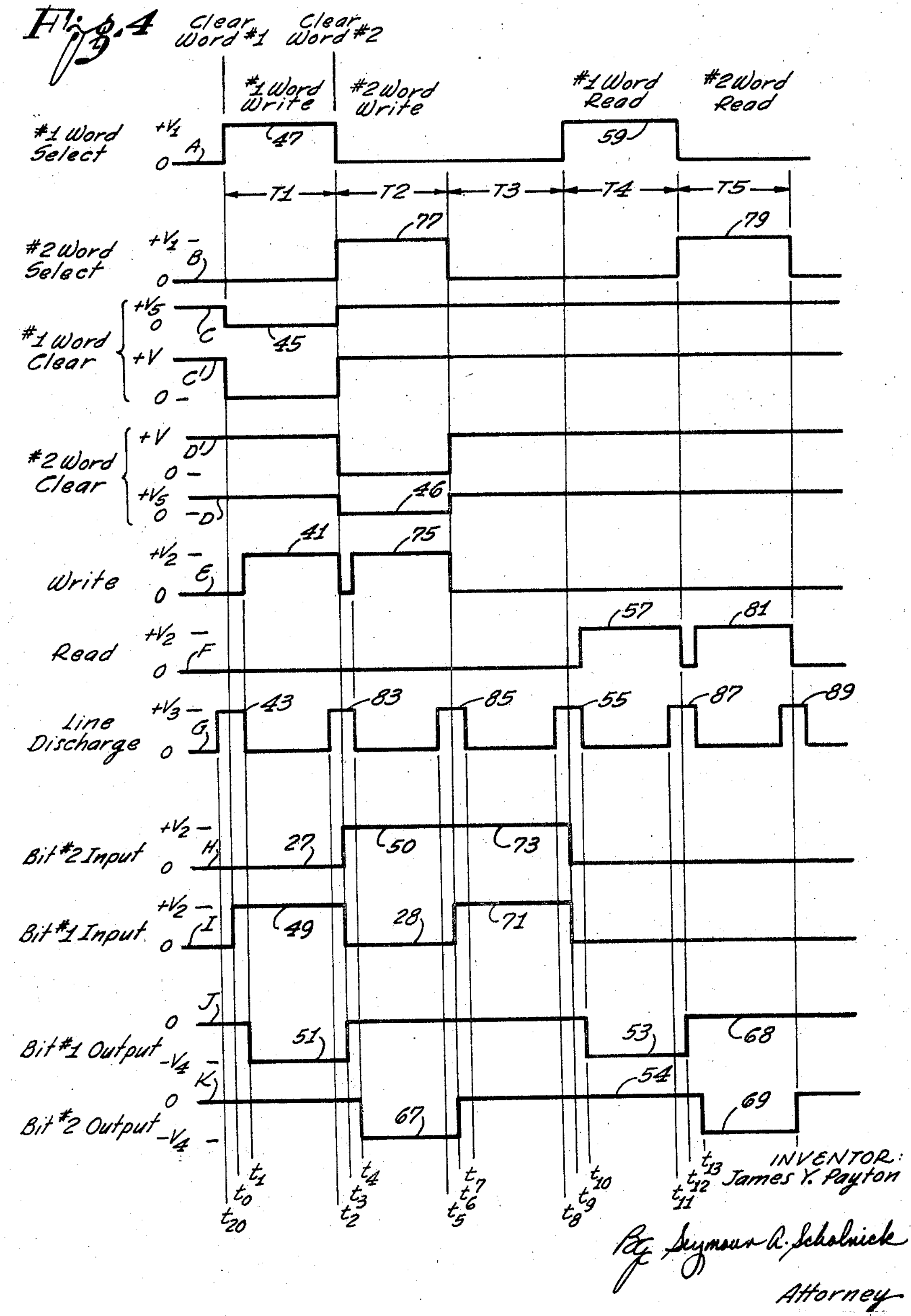

To establish the hold mode of operation, bilevel word clear command signal C at its high level is applied to the base electrode of transistor Q1 of word clear circuit 7, for example a high level word clear signal C being illustrated in FIGURE 4 during time period T2. The application of word clear signal C at its high level drives transistor Q1 into saturation and thereby places terminal 16 of memory element 3 at a potential substantially equal to the predetermined voltage +V. With terminal 16 at a potential substantial equal to voltage +V, bias current $I_B$ is generated through resistor R5, current $I_B$ flowing through tunnel diode TD1 and resistor R7 of the inoperative word select circuit 5 to the source of ground potential. Thus the hold mode is established and bias current $I_B$ flowing through tunnel diode TD1 will maintain the low voltage operating condition of that tunnel diode. In the hold mode of operation, only memory element 3 and word clear circuit 7 are operative, all other memory system circuits being held in an inoperative condition by maintaining their bilevel command control signals at the low level.

Assume a binary "1" digit value is to be written into the memory element for storage therein, the binary "1" digit being represented by a high level pulse 49 on bilevel input signal I during a first time interval T1, as shown in FIGURE 4. Accordingly, as would occur in the normal sequence of operations of memory system 11, the memory element is cleared of all previously stored binary digital data by reducing word clear command signal C to its low level, this operation being illustrated in FIGURE 4 by the application of a low level pulse 45 of word clear command signal C at a time $t_0$ beginning the first time interval T1. As was hereinbefore explained, the application of word clear command signal C at its low level reduces bias current $I_B$ to zero thereby uniformly setting and insuring that tunnel diode TD1 is operating in its low voltage state. Accordingly, the memory element is cleared of previously stored information. Those skilled in the memory device art will without difficulty realize that the ability of the memory system of the present invention to be cleared of previously stored binary information and new binary data written into the system during the same bit time interval, greatly adds to the operating speed and capability of this digital computer memory device.

Continuing with the write "1" operation, at time $t_0$ a high level pulse 47 of bilevel word select signal A is applied to word select circuit 5 driving transistor Q2 into saturation and reducing the potential at terminal 17 of memory element 3 to ground. The memory element is thereby made responsive to a read or a write current or, in other words, the memory element has been selected as that memory element to be operated upon. A short time thereafter, at a time $t_1$ during the first time interval T1, a high level pulse 41 of bilevel write command signal E is applied to diode D26 of write circuit 21. Write circuit 21 is responsive to the application of high level pulse 49 of data signal I and the high level pulse 41 of write command signal E for applying write current $I_w$ to terminal 12 of memory element 3. Since terminal 17 at the cathode electrode of tunnel diode TD1 has been placed at effectively ground potential, isolation diode D5 is heavily forward biased by the application of the write signal and is responsive, together with tunnel diode TD1, to the passage of write current $I_w$ therethrough, write current $I_w$ being greater in magnitude than the peak current magnitude of tunnel diode TD1 and of such a magnitude (usually greater than one milliamp but less than 5 milliamps) that it will drive tunnel diode TD1 to its high voltage state of operation. While the write operation is being performed, both read command signal F and line discharge command signal G remain at their low levels. However, output amplifier 9, detecting the memory element's response to write current $I_w$, produces an output pulse 51 on output signal J during time interval T1. At a time $t_3$ signifying the end of time interval T1 and the beginning of time interval T2, write command signal E returns to its low level, word select command signal A returns to its low level, and word clear command signal C is changed to its high level for re-establishing bias current $I_B$ to maintain and hold the high voltage operating state of tunnel diode TD1 thereby storing the binary "1" digit value therein.

Assume, on the other hand, that a binary "0" digit value was to be written into the memory element for storage therein, the binary "0" digit being represented by a low level pulse on bilevel input signal I. For such a writing operation, the application sequence and bilevel command signals applied to memory system 11 would be identical to those described for writing a binary "1" digit into the memory element. However, when the high level pulse of write command signal E is applied to gating circuit 22, bit input signal I, being applied at its low level, the low level representing a binary "0" digit value, would draw write current $I_W$ away from memory element 3 and through diode D27 to the source of the bit input signal. Accordingly, the memory element would be left operating in its cleared or low voltage state and, during subsequent hold modes of operation, bias current $I_B$ would maintain the low voltage operating state thereby representing and storing the binary "0" digit value therein.

At the next time interval T2, or any time interval thereafter, the stored binary "1" or "0" digit information may be read out of memory element 3 during a read mode of operation. For purposes of example, assume that the stored binary "1" digit is to be read out of memory element 3 during a time interval T4 as shown in FIGURE 4. To avoid discharging stray capacitive charges present on conductor 4 through the memory element, at a time $t_8$ a high level pulse 55 of bilevel line discharge signal G is applied to line discharge circuit 24, word select command signal A changing from a low to a high level during the time duration of pulse 55, line discharge signal G returning to its low level at a time $t_{10}$. More particularly, during the duration of pulse 55, at a time $t_9$, a high level pulse 59 of bilevel word select command signal A is applied to word select circuit 5, again reducing the voltage magnitude at terminal 17 of memory element 3 to approximately ground potential. In contrast to the operation of word clear circuit 7 during the write mode of operation, word clear circuit 7 in the read mode continues to have bilevel word clear command signal C applied thereto at its high level thereby continuing the application of bias current $I_B$ to the memory element.

At time $t_{10}$ a high level pulse 57 of bilevel read command signal F is applied to diode D25 of read circuit 14, the application of read command signal F at its high level causing read current $I_R$ to flow through conductor 8 to memory element 3. Since memory element 3 has been made responsive to the application of a read or write current by actuating words select circuit 5, read current $I_R$ conductively biases isolation diode D5 of memory element 3 independent of the operating voltage state of tunnel diode TD1, isolation diode D5 and tunnel diode TD1 responding to the passage of read current therethrough by producing a voltage response signal at terminal 12 of the memory element corresponding to and substantially following the operating high voltage state of the tunnel diode. More particularly, the voltage response signal produced at terminal 12 is substantially equal to the high operating voltage state of tunnel diode TD1 plus the voltage drop across the conductively biased isolation diode D5. The voltage response signal at terminal 12 is transmitted through conductor 4 to terminal 18 of output read amplifier 9, the voltage drop across correction diode D9, as was hereinbefore described, subtracts from the voltage response signal presented to terminal 18 and produces at terminal 19 the substantially unaltered voltage response signal of tunnel diode TD1 alone, the transistor amplifier means of output amplifier 9 producing an output pulse in accordance with the high voltage response signal from tunnel diode TD1. Thus, when reading a memory element's tunnel diode that is operating in its high voltage state, thereby storing a binary "1" digit value therein, output read amplifier 9 produces an output pulse in representation thereof. On the other hand, no output pulse is generated when a memory element operating in its low voltage state, thereby storing a binary "0" digit value therein, is sampled by the read circuit.

More particularly, assuming that a stored binary "0" digit value is to be read from the memory element, the application sequence and bilevel command signals applied to memory system 11 would be identical to those described hereinabove that were applied to the memory system for reading a binary "1" digit from the memory element. Nevertheless, the magnitude of the memory element's voltage response signal, produced in response to the applied read current, at terminal 12 is substantially equal to the low operating voltage of the memory element's tunnel diode plus the voltage drop across forward conducting isolation diode D5, which response signal, when transmitted to output amplifier 9 and after correction circuit 10 eliminates that part of the signal contributed by the isolation diode, is insufficient in magnitude to cause an output pulse to be generated. The absence of an output pulse during a time interval when a known read operation is being performed signifies the storage of a binary "0" digit value in the tunnel diode of the memory element operated upon.

Figure 3:
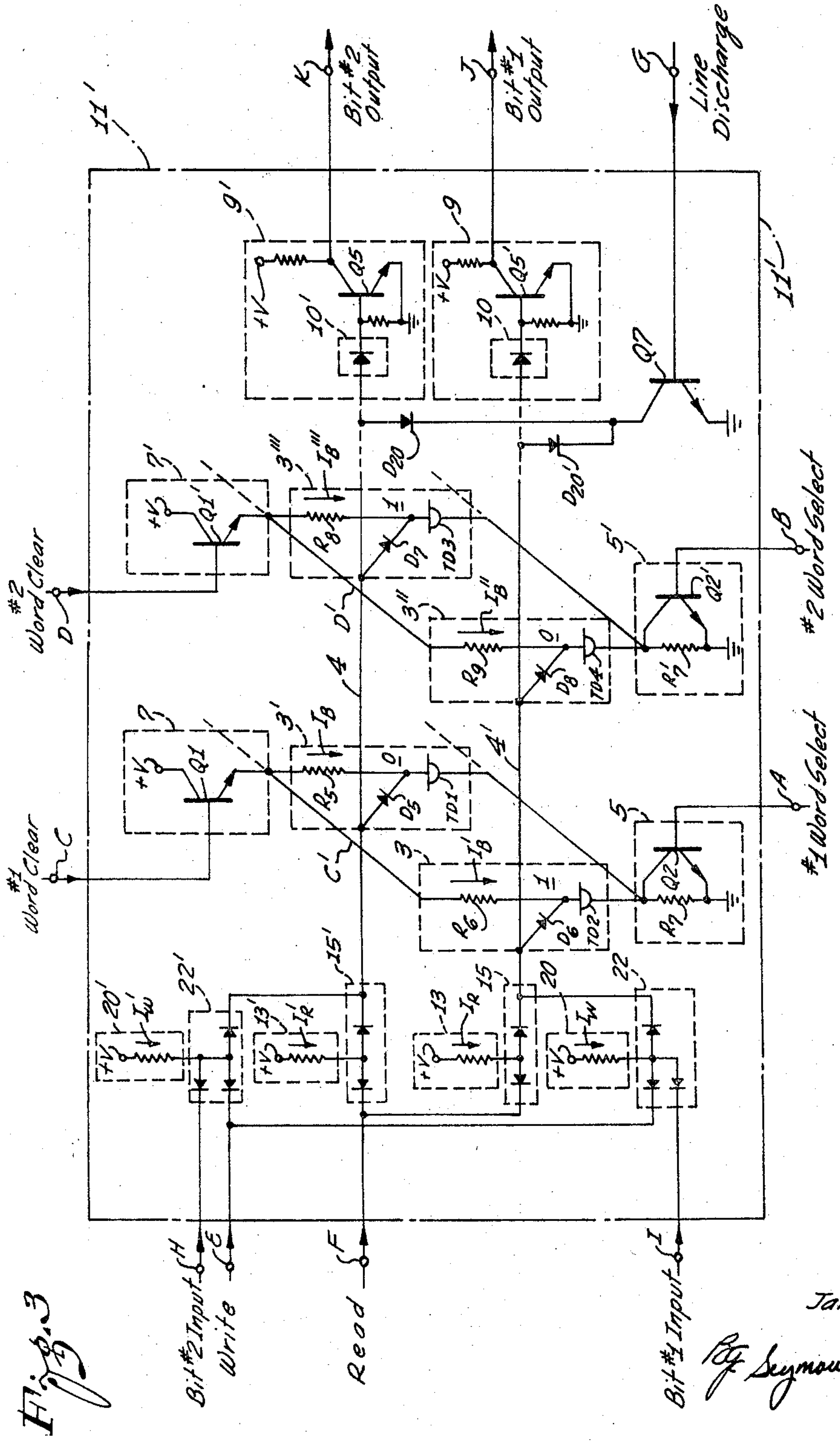

Referring now to FIGURE 3 wherein is illustrated a preferred embodiment of a memory system of the present invention that is capable of storing many digital data words, each data word comprising a number of binary digits, there is shown in FIGURE 3 a memory system 11′ comprising the same circuit elements as did memory system 11 of FIGURE 1, with the addition of a word clear circuit 7′ and a word select circuit 5′ for controlling the maintainence of tunnel diode bias currents $I_B''$ and $I_B'''$ and for selecting the memory elements 3″ or 3‴ to be operated upon, respectively. Still further, memory system 11′ includes additional read circuitry comprising read current generator 13′ and gating circuit 15′ together with an additional output amplifier 9′ having a correction circuit 10′ included therein. Write circuitry has also been added to the memory system shown in FIGURE 3 in the form of write current generator 20′ and gating circuit 22′ which are interconnected in the same manner as was hereinbefore described to the memory elements 3′ and 3‴ of memory system 11′, memory elements 3′, 3″, and 3‴ being added to memory system 11′ for the storage of three additional binary digits therein.

To facilitate the description of the operating characteristics and procedures for a memory system of the present invention capable of storing a first predetermined number of digital data words, each data word having a second predetermined number of binary digits therein, there is shown in FIGURE 4 illustrative voltage waveforms of bilevel signals A through K, respectively, as they would appear during the operation of the embodiment of the invention illustrated in FIGURE 3.

Referring with particularity to the operation of memory system 11′ as illustrated in FIGURE 3, assume that during the first time interval T1, for example, that a binary "1" and a binary "0" digit are to be written into memory elements 3 and 3′, respectively, of a first data word storage location in the memory system, bilevel input signal I containing the binary "1" digit in the form of a positive-going, high level pulse 49 and input signal H containing the binary "0" digit in the form of a low level pulse 27. Both pulses 49 and 27 are applied at a time $t_0$, beginning time interval T1, to the bit input terminals of gating circuits 22 and 22′, respectively. At a time $t_{20'}$ occurring a short time before the initiation of time interval T1, a line discharge pulse 43 is applied to line discharge transistor Q7 which is triggered thereby into operation for a short time interval overlapping the changes in state of the word select signals. A plurality of line discharge pulses 83, 85, 86, 87, and 89 are similarly applied at the end of time intervals T1, T2, T3, T4, and T5, respectively, for preventing, as hereinbefore mentioned, the stray capacitive charges present on the sense line conductors from discharging through the tunnel diodes when their respective word select transistor is rendered conductive.

Continuing with the discussion of memory system 11′, in addition to the bit input signals and the line discharge signals, a high level pulse 47 of word select signal A and a low level pulse 45 of word clear signal C are simultaneously applied to circuits 5 and 7, respectively, at time $t_0$ for making the two memory elements of said first data word responsive to the application of new binary information and for uniformly setting the two memory element tunnel diodes, TD1 and TD2, to their low voltage states. The clearing operation having been performed, a high level pulse 41 of write command signal E is applied to gating circuits 22 and 22′ at a time $t_1$. Gating circuits 22 and 22′ are operative for applying a write current to their associated memory elements only when all the signals applied to the gating circuits are at their high level or, in other words, in the true state. Hence, write pulse 41 and data pulse 49 being applied to gating circuit 22 are of such a high level as to cause write current $I_w$, produced by current generating circuit 20, to flow through conductor 4 to memory elements 3 and 3″. Since only memory element 3 has been made responsive to the application of this write current, only the tunnel diode contained therein, tunnel diode TD2, is set to its high voltage state of operation, write current $I_w$ flowing through an isolation diode D6, tunnel diode TD2 and through the saturated word select transistor Q2 to ground potential.

Meanwhile, during time interval T1, write pulse 41 and low level pulse 27 are applied to gating circuit 22′. However, since the data input signal is at its low potential level, write current $I_w'$ does not flow to the selected memory element 3′, but rather write current $I_w'$ flows to the source of low level pulse 27. Hence, tunnel diode TD1 of memory element 3′, which has been rendered operative in its low voltage state by the word clear operation, remains in this condition thereby representing the binary "0" digit to be stored therein. At the end of time interval T1, at a time $t_3$, word clear circuit 7 is responsive to bilevel word clear command signal C at its high level for re-establishing bias currents $I_B$ and $I_B'$ in memory elements 3 and 3′, respectively, and simultaneously word select circuit 5 is deactivated, thereby elevating the cathode electrodes of tunnel diodes TD1 and TD2 to a potential above ground. Accordingly, within memory elements 3 and 3′ of said first data word of the memory system are stored in a binary "1" digit and a binary "0" digit, respectively, in accordance with the information contained in bilevel data signals I and H.

In a similar manner, during a second time interval T2, assume that a binary "0" digit and a binary "1" digit are to be written into memory elements 3″ and 3‴ of the second data word, respectively, bilevel input signal I containing the binary "0" digit therein as a low level pulse 28 and bilevel input signal H containing the binary "1" digit therein as a positive-going high level pulse 50. Again, bilevel input signals I and H are applied to the input terminals of gating circuits 22 and 22', respectively, at time $t_3$, initiating the second time interval T2, and memory elements 3'' and 3''' are cleared of previously stored information by the application of a low level pulse 46, of a word clear command signal D, to word clear circuit 7' and the application of a high level pulse 77, of a bilevel word select signal B, that is applied to word select circuit 5'. At a time $t_4$ during the second time interval T2, write pulse 75 of write signal E is applied to gating circuits 22 and 22'. Gating circuit 22, receiving write pulse 75 and low level pulse 28, as was hereinbefore described, diverts write current $I_w$ to the source of the low potential input signal and does not apply the write current to the responsive memory element 3''. On the other hand, gating circuit 22' is responsive to the application of write pulse 75 and high level data pulse 50 for applying write current $I_w'$ to responsive memory element 3'''. Write current $I_w'$ is conducted through a tunnel diode TD3 of memory element 3''' to the source of ground potential connected to word select circuit 5', thereby setting tunnel diode TD3 to its high voltage state of operation. At a time $t_6$, word select signal B and write signal E concurrently return to their low potential level, while simultaneously word clear signal D at its high level is reapplied to word clear circuit 7' for re-establishing the hold bias currents $I_B''$ and $I_B'''$.

Two write modes of operation have now been completed on memory system 11' whereby a binary "1" digit was written into memory element 3, a binary "0" digit was written into memory element 3', a binary "0" digit was written into memory element 3'', and a binary "1" digit was written into memory element 3'''. The write modes having been completed, as was hereinbefore explained, the tunnel diode bias currents $I_B$, $I_B'$, $I_B''$, and $I_B'''$ maintain the binary digit values in the respective memory elements during a subsequent hold mode of operation.

During the next time interval T3 in the memory system cycle illustrated in FIGURE 4, there are shown two high level data pulses, 71 and 73, of bit input signals I and H, respectively, that are applied to their respective gating circuits 22 and 22'. However, the pulses have been here included to illustrate that the operating voltage states of the memory elements are not altered by the writing circuits without the application of a write command signal E to the gating circuits to which the data pulses are applied.

Later, assuming that the stored binary information is to be read from the memory elements during a read operation, a word select signal is applied to the word select circuit connected to the memory elements in which information to be read out is stored while, simultaneously, a read command signal is applied to the corresponding read circuit. The read circuit is responsive thereto for sampling the operating voltage states of the selected memory elements, the memory elements producing voltage response signals corresponding to and substantially following their tunnel diode operating voltage states, the response signals being transmitted to the respective output amplifiers which generate output signals in representation thereof. In this regard, assume for example that, during a time interval T4, the binary information stored within said first data word of the memory system is to be read out. Since said first data word of the memory system comprises memory elements 3 and 3', a high level pulse 59 of word select signal A is applied to word select circuit 5 connected thereto, thereby making memory elements 3 and 3' responsive to the application of a read or a write command signal. The memory elements of said first data word having been rendered responsive to a read command signal, a high level pulse 57 of read command signal F is applied to both gating circuits 15 and 15', both gating circuits applying a respective read current $I_R$ and $I_R'$ through sense line conductors 4 and 4', respectively, to their respective memory elements 3 and 3'. The application of read current $I_R$ to isolation diode D6 of memory element 3, wherein is stored a binary "1" digit value represented by tunnel diode TD2 operating in its high voltage state, read current $I_R$ being conducted through diode D6 and tunnel diode TD2 to ground potential, causes the serially connected combination of isolation diode D6 and tunnel diode TD2 to produce at the anode electrode of diode D6 a voltage response signal corresponding to and substantially following the operating high voltage state of tunnel diode TD2 plus the voltage drop across conducting isolation diode D6. Similarly, in memory element 3', wherein a binary "0" digit has been stored as represented by tunnel diode TD1 operating in its low voltage state, the applied read current $I_R'$ is conducted from the anode electrode of isolation diode D5 therethrough tunnel diode TD1 to ground potential, thereby producing a voltage response signal at the anode electrode of isolation diode D5 corresponding to and substantially following the operating low voltage state of tunnel diode TD1 plus the voltage drop across conducting isolation diode D5. The voltage response signals present, respectively, at the anode electrodes of isolation diodes D6 and D5 are transmitted to output amplifiers 9 and 9', respectively, via respective sense line conductors 4' and 4. As was hereinbefore described, correction circuits 10 and 10' substantially eliminate the voltage displacement effect produced on the respectively applied voltage response signals by the voltage drops across the isolation diodes and reproduce substantially the unaltered voltage signal which would appear across the sensed memory element tunnel diodes alone. Accordingly, output amplifier 9 produces, in accordance with the binary "1" digit stored in memory element 3, a pulse 53 on bilevel output signal J while simultaneously, output amplifier 9' produces, in accordance with the binary "0" digit stored in memory element 3', a low level pulse 54 from a time $t_{10}$ to a time $t_{12}$ of time interval T4. Thus, signals representing the binary digital information stored in said first data word of the memory system have been exited from the system on command without destroying the information stored therein.

Assume now, for example, that the binary information stored in the second data word of the memory system is to be sensed and signals produced in representation thereof, the second data word comprising memory elements 3'' and 3''' wherein are stored a binary "0" digit and a binary "1" digit, respectively. At a time $t_{12}$ initiating a fifth time interval T5, a high level pulse 79 of word select command signal B is applied to word select circuit 5 thereby selecting the memory elements of said second data word as those memory elements to be operated on either by the application of a write or a read current. Shortly thereafter, at a time $t_{13}$, a high level pulse 81 of read command signal F is applied to read gating circuit 15 and 15'. Gating circuits 15 and 15' operate to apply read currents $I_R$ and $I_R'$ to memory elements 3'' and 3''', respectively. The application of read current $I_R$ to memory element 3'', wherein is stored a binary "0" digit, causes the memory element to produce a voltage response signal at the anode electrode of diode D8 that corresponds to and substantially follows the low voltage operating state of tunnel diode TD4 plus the voltage drop across conducting isolation diode D8. Simultaneously, the application of read current $I_R'$ to memory element 3''', wherein is stored a binary "1" digit, causes the memory element to produce a voltage response signal across its serially connected combination of isolation diode D7 and tunnel diode TD3 that corresponds to the high operating voltage of tunnel diode TD3 plus the voltage drop across isolation diode D7. During the read mode of time interval T5, the response signals are transmitted from the anode electrodes of diodes D8 and D7 via sense line conductors 4' and 4 to their respective output amplifiers 9 and 9', which operate to correct for the voltage drops across the isolation diodes and produce output signals corresponding to the operating voltage states of the tunnel diodes. More particularly, output amplifier 9 during the fifth time interval T5, in response to the voltage response signal from memory element 3'', generates a low level pulse 68 on bilevel output signal J, while output amplifier 9', in response to the voltage response signal of memory element 3''', produces a pulse 69 on output signal K, pulses 68 and 69 representing the binary "0" digit and binary "1" digit, respectively, stored in the memory elements. Accordingly, the binary information stored in said second data word of the memory system has been read from the memory elements and output signals produced in representation thereof without destroying the stored information.

It should be here noted that the application of read current $I_R$, or its counterpart $I_R'$, to any memory element of the memory system, which is already conducting the store bias current $I_B'$ or one of its counterparts, does not change the operating voltage state of the tunnel diode to which it is applied since the summation of read current $I_R$ and bias current $I_B$ is calculated to be substantially less than the peak current magnitude of the tunnel diode.

Figure 5:
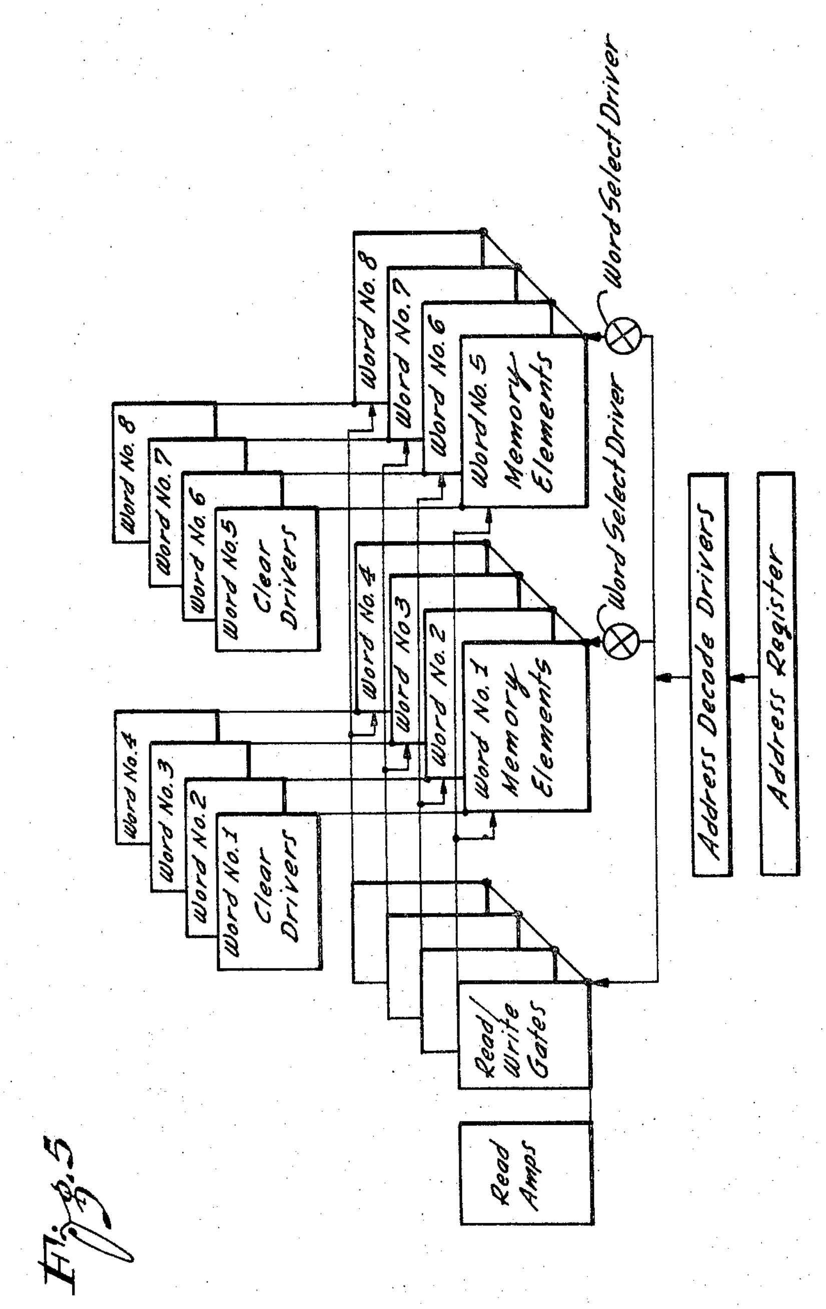
FIGURE 5 is a generic block diagram illustrating the arrangement of address-factoring circuitry which may be utilized in preferred embodiments of the present invention.

Referring now to FIGURE 5, there is shown a memory location address factoring circuit that may be employed in preferred embodiments of the present invention. To properly understand the advantages of such an address factoring capability of the present invention, it is desirable to be familiar with the terminology used relative to storage of information in and instruction signals applied to the computer memory. Those skilled in the art are, of course, familiar with the comparison of a computer memory to a large number of "pigeonholes," each "pigeonhole" having a label or "address" by which it can be identified, each of these "pigeonholes" or locations in the memory system holding a quantity of information. In general, this quantity of information stored in each "pigeonhole" is usually one bit of a data word, a predetermined number of "pigeonholes" being grouped together to store therein the full data word. To use this stored information in the computer operation, a number of command signals are applied to the memory system in order to locate the data word "pigeonholes" and to remove a plurality of response signals corresponding to the information contained in the selected "pigeonholes" of the predetermined data word. The "pigeonholes," of course, correspond to the memory elements of the present memory system.

Therefore, as described hereinabove, to read out information from the present invention, a read command signal and a word select signal need be applied to the memory elements of the particular data word group of memory elements to be read. The term "address" location, in the memory system, is used to denote the particularly located memory element in a data word group of memory elements that is effected by two coincidently applied command signals, for example, the read and word select command signals. The present memory system as illustrated in FIGURE 3 has four such memory address locations that are positioned at the intersections of the read/write sense line conductors and the word clear/word select driver lines. Thus, to perform a word select operation for each data word group of memory elements in the memory system of the present invention, shown in FIGURE 3, a separate word select transistor is required. Similarly, a word clear operation to be performed on each data word group of memory elements in the memory system, requires the use of a word clear transistor. If this condition could not be improved upon by eliminating certain ones of the word select or word clear circuits, the memory system of the present invention would be somewhat limited in its applications. Fortunately, the memory system of the present invention is amenable to the factoring of memory addresses.

Accordingly, in FIGURE 5 is shown a block diagram of the address factoring circuitry applied to the memory system of the present invention. In this regard, it will be noted that each word select driver selects several data word groups of memory elements of the memory system to be operated upon and renders them responsive to the application of a read or write signal. The read/write gates are addressed by address decode drivers, the decode drivers receiving information from an address register and in response thereto making the read/write gates operable selecting one word group of the preselected several data word memory element groups to be written into by the write circuitry or to be sensed by the read amplifiers. As will be apparent to those skilled in the art, the word select address factoring system herein illustrated renders the memory system of the present invention capable of storing four times as many digital data words as was previously possible using the same number of word select driver circuits.

Figure 6:
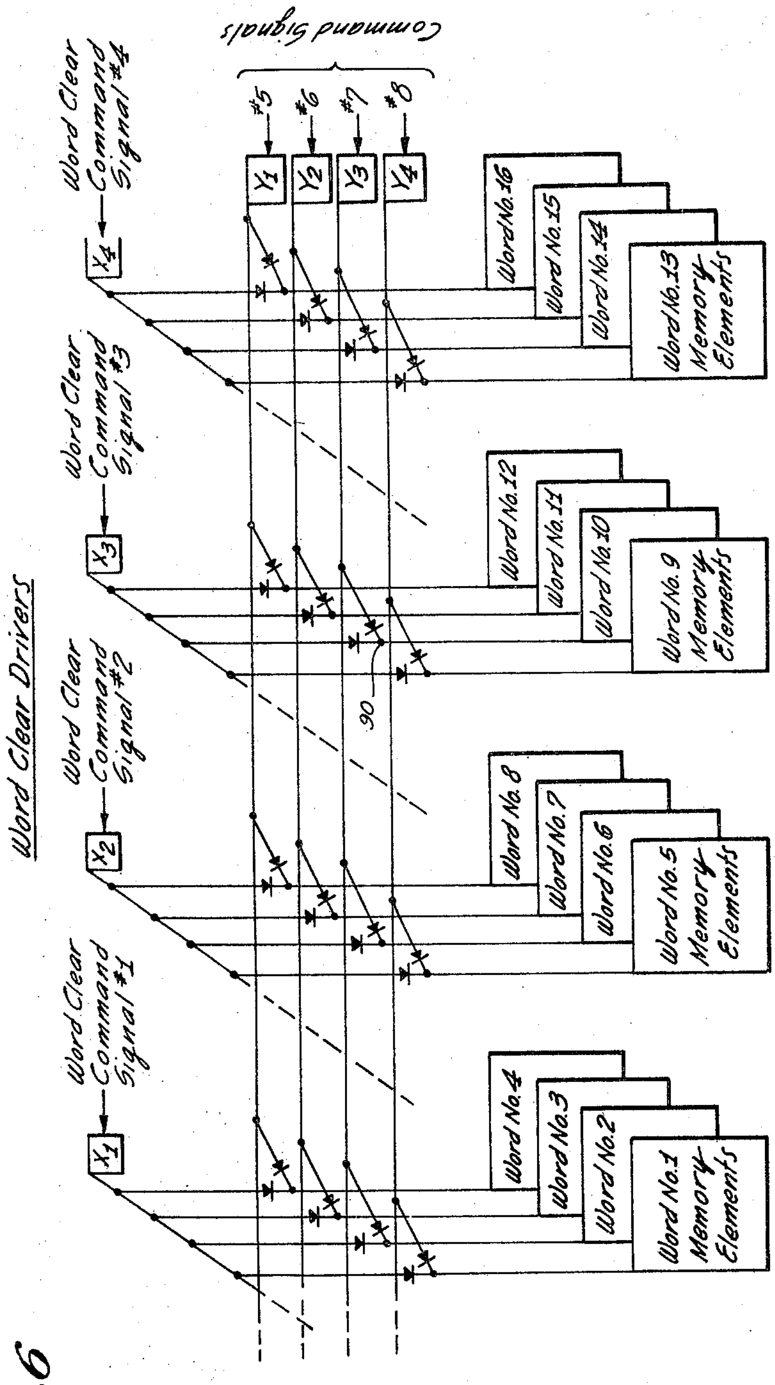
FIGURE 6 is a partly block, partly circuit diagram of word clear factoring circuitry which may be utilized in preferred embodiments of the tunnel diode memory system of the present invention.

As illustrated in FIGURE 5, however, each word in the memory system still requires a separate word clear driver. To substantially reduce this requirement, thereby reducing the number of components in the memory and concomitantly reducing its power dissipation during operation, there may be employed in the present tunnel diode memory system a coincident current word clear factoring circuit as illustrated in the partly block, partly circuit diagram of FIGURE 6. Using the coincident current address factoring circuit shown in FIGURE 6, the word clear operation is performed by the simultaneous application of a word clear command signal to one of four illustrated "X" word clear drivers and a second word clear command signal applied to one of four "Y" word clear drivers. Thus, assuming that the memory elements of the tenth data word group of tunnel diode memory elements are to be cleared of previously stored data, a word clear command signal 3 is applied to word clear driver $X_3$ while simultaneously a word clear command signal 7 is applied to word clear driver $Y_3$, thereby reducing the potential at a coincident terminal 90 to which is connected, as hereinbefore described in connection with the word clear circuits of FIGURE 1 and FIGURE 3, one terminal of all memory element resistors of the memory elements of data word 10. As hereinbefore discussed, the reduction of potential at this point concomitantly reduces the tunnel diode bias currents to zero and sets the tunnel diodes of the memory elements to their low voltage state of operation. While three other groups of memory elements receive the word clear signal from the activated word clear driver $X_3$, only the memory elements in the fourth group of memory elements to which are coincidently applied the word clear signal from word clear driver $X_3$ and the word clear signal from word clear driver $Y_3$ are cleared of previously stored binary data. The word clear factoring circuit as illustrated in FIGURE 6, therefore, permits the number data words capable of being stored in the memory system of the present invention to be doubled while using the same number of word clear driver circuits. By combining both the address factoring circuit illustrated in FIGURE 5, for word select operations, and the address factoring circuit illustrated in FIGURE 6, for word clear operation, a memory system of the present invention may be mechanized to include eight times as many tunnel diode memory elements as was hereinbefore possible with the memory system shown in FIGURE 3 using the same number of driving circuits, thereby having the capability of storing eight times as many binary digits therein.

Referring again to FIGURE 2*a* and, more particularly, to the load lines thereon superimposed, it should be noted that load line 33 has been chosen to allow both the high and low voltage states, as represented by points 31 and 34, respectively, of the tunnel diode to be stable and yet require a minimum of quiescent power. The most sensitive aspect in selecting the hold load line is the margin of current to be provided above the minimum tunnel diode valley current magnitude. It has been found however, that a broad safety margin can be maintained by utilizing only tunnel diodes having a peak-to-valley ratio of four or more and by setting the tunnel diode bias current level at approximately one-half the value of the peak current magnitude of said tunnel diodes.

Load line 35 represents the state of the tunnel diode when it is being read, that is, when its operating voltage state is being sensed by the combination of a read circuit and a read amplifier. Throughout the read operation, both the high and the low voltage state, as represented by points 32 and 36, respectively, are still stable and the shift from the store mode of operation to the read mode does not change the state of the tunnel diode. Thus, a non-destructive read operation may be performed simply by detecting the voltage state of the tunnel diode in the manner hereinbefore described. By utilizing silicon semiconductor tunnel diodes, a difference of approximately 600 millivolts will exist between the two operating states of the tunnel diode, thus allowing detection by low-level logic techniques. In the read mode, however, care must be taken to limit the magnitude of current that may flow through the tunnel diode when it is being read in the low voltage state. This read current must be kept below the peak current magnitude of the tunnel diode (usually about one milliampere) to avoid changing the operating voltage state of the tunnel diode, a task accomplished by keeping the read current at a minimum and by utilizing only tunnel diodes with a peak current magnitude compatible with the required read current.

Similarly, the load line for the clear operation, load line 30, implies a reduction of the bias current to approximately zero. Accordingly, in this condition of operation, the low voltage state of the tunnel diode is the only stable state of operation and it has been referred to herein as the cleared or binary "zero" state. It should be apparent to one skilled in the art that the bias current never can be completely reduced to zero because of leakage currents. The magnitude of the leakage currents will depend on the quality of the isolation diodes, the number of interconnected memory elements in the memory matrix, and thermal environment of the memory system.

Load line 37 represents the operating condition of memory element 3 that exists when a binary "1" digit is being written into the memory element. The write current has been set at a value greater than the peak current magnitude of the tunnel diode which, when applied to the memory element, will drive the tunnel diode to its high voltage state, the store bias current $I_B$ subsequently maintaining the set voltage state until a clear operation is performed. For the write operation, the primary design requirement is for the write current to exceed the peak current magnitude of the tunnel diode and yet not exceed the maximum current and/or power rating of the device.

In the foregoing description of the operation of the tunnel diode memory system mechanized in accordance with the present invention, while bilevel input signals at their positive or high voltage level have been used to trigger the gating circuits of the read and write apparatus of the memory system, those skilled in the art will, however, readily understand that the basic read and write structure described hereinabove will operate just as effectively when the semiconductor diodes of the system have been connected in opposite polarity as they are shown connected in FIGURES 1 and 3 and negative-going pulses substituted for the positive pulses in the gate input signals.

It will be further recognized by those skilled in the art that other structures could be employed to mechanize the basic concept of the present invention. The particular hardware described in the present disclosure that is, of necessity, associated with the concept of the invention in no way limits the number of available circuits in the art that can be applied. In this regard, it is clear, of course, that numerous modifications and alterations may be made in the word select circuit and the word clear circuit, herein described, without departing from the spirit of the invention. For example, while word select circuit 5, as illustrated in FIGURE 1 and FIGURE 3, is composed of a transistor and a shunt resistor, other circuits known in the art may be utilized. More particularly, a common relay may be substituted for transistor Q2, the relay having some form of shunt impedance between two of its terminals for conducting the memory element bias current during the quiescent hold mode of operation, the relay being energizable for shunting this fixed impedance to ground potential. Similarly, a relay or semiconductor switching circuit may be employed in the place of word clear circuit 7 which has been herein described as comprising only a transistor for conducting or not conducting a current therethrough. Furthermore, while the output amplifier of the present invention is relatively simple in its mechanization, a more complex amplifier circuit, possibly having certain waveshaping characteristics, may be employed without departing from the spirit and scope of the present invention.

From the above it should also be noted that many types and combinations of logic circuits could be utilized in conjunction with address decoding apparatus for selecting the location of a memory element within the memory system into which information is to be written and stored or from which information is to be retrieved. Furthermore, while a particular line discharge circuit has been shown for clarity in both embodiments of the present invention illustrated in FIGURES 1 and 3 by way of example only, the omission of this particular circuit and the substitution of other means for controlling the inherent stray capacitance contributed by the isolation diodes in no way detracts from the characteristic inventive features of the present invention. Accordingly, from the foregoing, it is evident that various modifications in the structure of the invention may be made and it should be expressly understood that the invention is limited only by the spirit and scope of the appended claims.

What is claimed as new is:

1. In a tunnel diode memory system, apparatus selectively responsive to the application of a signal representing either the binary "1" or "0" value for storing the binary "1" or "0" value as a high or low voltage state, respectively, of a tunnel diode, said apparatus comprising:

- a memory element including a first resistor having a first and a second terminal, a tunnel diode having a first and a second electrode and having said first electrode coupled to said second terminal of said first resistor, said memory element further including an isolation diode having a first electrode and a second electrode coupled to said second terminal of said first resistor, said tunnel diode and said isolation diode being oppositely poled with respect to said second terminal of said first resistor, said tunnel diode being responsive to the passage therethrough of a first predetermined substantially constant current, exceeding the peak current magnitude of said tunnel diode, for assuming its hight voltage state of operation;
- a first source of fixed potential;
- word select means normally interconnecting said tunnel diode and said first source of fixed potential;
- a source of maintaining current;
- a memory maintaining and clearing means intercoupling said source of maintaining current and said first terminal of said first resistor for normally applying to said memory element said maintaining current to maintain the voltage state of said tunnel diode, said maintaining and clearing means being operable at preselected times for inhibiting said maintaining current to set said tunnel diode to its low voltage state;
- means for producing said first predetermined substantially constant current, said predetermined constant current exceeding the peak current magnitude of said tunnel diode, said means including a second resistor having a first and a second terminal and having an impedance value large compared to the impedance of said tunnel diode, said second resistor being coupled by said first terminal to a source of substantially constant voltage for generating, in combination with said voltage source, said first predetermined current; and a write means for selectively applying said first predetermined current to said memory element, said write means interconnecting said means for producing said first predetermined substantially constant current and said isolation diode first electrode, said write means including apparatus that receives the applied signal representing the binary "1" or "0" value and is responsive to the applied signal at its binary "1" value for causing said first predetermined current to flow through said tunnel diode to establish its high voltage state of operation.

2. The memory apparatus defined in claim 1 wherein said maintaining current is greater than the minimum valley current of said tunnel diode and less than the peak current magnitude of said tunnel diode.

3. The combination defined in claim 1 wherein said word select means normally connects said tunnel diode to said first source of fixed potential through a fixed impedance, said switching means being responsive to an applied address signal for establishing a low impedance circuit from said tunnel diode to said first source of fixed potential to shunt said fixed impedance.

4. The combination as defined in claim 3 wherein said word select means interconnecting said tunnel diode and said first source of fixed potential includes a third resistor having a first and a second terminal and a transistor having two output electrodes and a control electrode, said transistor having a first of said output electrodes coupled together with said first terminal of said third resistor to said tunnel diode, said transistor having a second of said output electrodes coupled together with said second terminal of said third resistor to said first source of fixed potential, said word select means being responsive to a word select command signal applied to said transistor control electrode for conductively biasing said isolation diode so as to permit the passage of said first predetermined current through said tunnel diode.

5. In a tunnel diode memory system, apparatus selectively responsive to the application of a signal representing either the binary "1" or "0" value for storing a single binary "1" or "0" value as a high or low voltage state of operation, respectively, of a tunnel diode, said apparatus comprising:

a memory element including a first resistor having a first and a second terminal, a tunnel diode having an a cathode electrode and having said anode electrode connected to said second terminal of said first resistor, said memory element further including an isolation diode having an anode and a cathode electrode, said isolation diode cathode electrode being connected to said second terminal of said first resistor, said tunnel diode being responsive to passage therethrough of a first predetermined current, exceeding the peak current rating of said tunnel diode, for assuming its high voltage state of operation;

a memory maintaining and clearing means connected to said first terminal of said first resistor for normally applying to said memory element a predetermined maintaining current to maintain the operating voltage state of said tunnel diode, said maintaining and clearing means being operable at preselected times for inhibiting said maintaining current to set said tunnel diode to its low voltage state of operation;

a first source of fixed potential;

a switching means normally interconnecting said tunnel diode cathode electrode and said first source of fixed potential;

a source of predetermined constant current, exceeding the peak current rating of said tunnel diode, said source including a second resistor having a first and a second terminal and having an impedance value large compared to the impedance of said tunnel diode, said second resistor being connected by said first terminal to a source of substantially constant voltage for generating, in combination with said voltage source, said first predetermined current; and a write means interconnecting said source of predetermined constant current and said isolation diode anode, said write means receiving the applied signal representing the binary "1" or "0" value and being responsive to the applied signal at its binary "1" value for applying said first predetermined current to said memory element and through said tunnel diode to establish the high voltage state of operation in said tunnel diode.

6. In a memory device, reading apparatus responsive to a command signal for sensing the high or low operating voltage state of a selected tunnel diode, the high or low voltage state representing stored binary "1" or "0" digit, respectively, said apparatus comprising:

a memory element including a first resistor having a first and second terminal, a tunnel diode having a first and second electrode and having said first electrode coupled to said second terminal of said first resistor, said memory element further including an isolation diode having a first electrode and having a second electrode coupled to said second terminal of said first resistor, said tunnel diode and said isolation diode being oppositely poled with respect to said second terminal of said first resistor, said tunnel diode being operable in response to the application of a maintaining current therethrough for conducting said maintaining current at either the high or low operating voltage state representing the binary "1" or "0" digit, respectively;

a source of predetermined maintaining current;

a memory maintaining means interconnecting said source of maintaining current and said first terminal of said first resistor for normally applying said maintaining current to said memory element;

a first source of fixed potential;

a switching means interconnecting said first source of fixed potential and said second electrode of said tunnel diode to normally couple said tunnel diode second electrode to said first source of fixed potential through a fixed impedance, said switching means being responsive to an applied address signal for establishing a low impedance circuit from said tunnel diode second electrode to said first source of fixed potential;

a read means responsive to an applied command signal for applying through said isolation diode and said tunnel diode a predetermined read current for conductively biasing said isolation diode independent of the operating voltage state of said tunnel diode, said isolation diode and tunnel diode being responsive to the passage of said read current therethrough for producing at said isolation diode first electrode a memory element response signal that corresponds to and substantially follows the operating voltage state of said tunnel diode; and amplifier means having an input and an output terminal and having its input terminal coupled to said first electrode of said isolation diode and being responsive to said memory element response signal for producing a bilevel output signal at said output terminal in representation thereof.

7. The combination defined in claim 6 wherein said amplifier means includes a correction diode having a first and second electrode, said correction diode having conduction characteristics substantially identical to those of said isolation diode and having its first electrode coupled to said isolation diode's first electrode, the poling of said isolation diode and said correction diode being identical with respect to their interconnection such that said response signal passes through said correction diode to provide a voltage drop thereacross substantially equal and opposite to the voltage drop across said isolation diode for compensating for the voltage drop across said isolation diode to insure that said response signal, representing the operating voltage level of said tunnel diode, is transmitted substantially unchanged to said amplifier means.

8. The reading apparatus of claim 7 including a line discharge means coupled between said first terminal of said isolation diode and a source of predetermined potential, said line discharge means being operable in response to an applied line discharge command signal for discharging in advance stray capacitances to the source of predetermined potential to prevent the discharge of said stray capacitances when said low impedance circuit is established by said switching means.

9. In a tunnel diode memory system, apparatus for reading stored binary digital data in the form of a first predetermined number of data words, from a memory matrix, each data word being composed of a second predetermined number of binary digits and each digit being represented by a high or a low voltage level signal corresponding to a first or a second binary digit, respectively, and being stored in an individual memory element, the memory elements being arranged in a matrix of parallel rows and columns corresponding to the respective words and digits of the data stored, said reading apparatus comprising:

a plurality of memory elements, each memory element being addressable as an individual digital data word comprising a single binary digit, each memory element storing said single binary digit therein, each of said memory elements including a first resistor having a first and a second terminal, a tunnel diode having a first and a second electrode and having said first electrode coupled to said second terminal of said first resistor, each memory element further including an isolation diode having a first and a second electrode and having said second electrode coupled to said second terminal of said first resistor, said tunnel diode and said isolation diode being oppositely poled with respect to said second terminal of said resistor, each of said memory element tunnel diodes being operable in response to the application of a maintaining current for conducting said maintaining current at either the high or the low operating voltage level representing the stored binary first or second digit, respectively;

a source of predetermined fixed maintaining current;

a plurality of memory maintaining and clearing means corresponding in number to said plurality of memory elements, each of said means interconnecting said source of maintaining current and an associated one of said memory elements at said first terminal of said first resistor for normally applying said maintaining current to the associated memory element to maintain the operating voltage state of the associated tunnel diode, each of said maintaining and clearing means being operable at preselected times for inhibiting said maintaining current to set the associated tunnel diode to its low voltage state;

a first source of fixed potential;

a plurality of switching means corresponding in number to said plurality of memory elements, each of said switching means interconnecting said first source of fixed potential and a distinct associated one of said memory elements at said second electrode to said tunnel diode to normally couple said tunnel diode second electrode to said first source of fixed potential through a fixed impedance, each of said switching means being individually responsive to a respective applied address signal for establishing a low impedance circuit from its associated tunnel diode second electrode to said first source of fixed potential to select a memory element and its associated tunnel diode for operation thereon and to enable its associated isolation diode to be conductively biased regardless of the operating voltage state of said selected tunnel diode;

a source of predetermined read current, said predetermined read current not exceeding the peak current magnitude of the tunnel diode, said source including a second resistor having a first and a second terminal and having an impedance value large compared to the impedance of a tunnel diode, said second resistor being coupled by said first terminal to a source of substantially constant voltage for generating, in cooperation with said voltage source, said read current;

a read means intercoupling said source of predetermined read current and all of said plurality of memory elements, said read means being operable in response to an applied read command signal for applying said read current to said selected memory element, said read current being applied to said selected memory element at said first electrode of the associated isolation diode conductively biasing said isolation diode independent of the operating voltage state of its respective tunnel diode, said conductively biased isolation diode causing a memory element voltage response signal present at said isolation diode's first electrode to be substantially the high or low voltage drop across its associated tunnel diode plus the voltage drop across the conductively biased isolation diode;

an amplifier means having an input and an output terminal, said amplifier means being responsive to said response signal corresponding to and substantially following the high or low voltage drop across said selected tunnel diode for producing an output signal in representation thereof; and a voltage correcting means interconnecting said input terminal of said amplifier means and all of said first electrodes of said isolation diodes, said voltage correcting means being responsive to the total response signal present at said conductively biased isolation diode's first electrode for continuously producing at the input terminal of said amplifier means the response signal less the voltage drop across said conductively biased isolation diode.

10. In a tunnel diode memory system for storing a predetermined number of digital data words, the combination comprising:

a first plurality of memory elements, each memory element being addressable as an individual digital data word and having a single binary digit stored therein, each of said plurality of memory elements including three associated components, a first resistor having a first and a second terminal, a tunnel diode having a first and a second electrode, and an isolation diode having a first and a second electrode, each of said plurality of memory elements having said first electrode of said tunnel diode and said second electrode of the associated isolation diode coupled to said second terminal of the associated first resistor, each of said tunnel diodes and its associated isolation diode being oppositely poled with respect to their connection to said second terminal of the associated first resistor, each of said memory element tunnel diodes being responsive to the passage therethrough of a predetermined write current, exceeding a peak current magnitude of said tunnel diode, for assuming its high voltage state of operation, and each of said tunnel diodes being further responsive to the application of a maintaining current for conducting said maintaining current at either a high or a low voltage state of operation representing a stored binary "1" or "0," digit respectively;

a first source of fixed potential;

a plurality of switching means corresponding in number to the number of digital data words able to be stored in the memory system, each of said switching means interconnecting said first source of fixed potential and the respective memory elements of an individual digital data word, each of said switching means normally coupling an electrode of each of its respective memory elements' tunnel diodes to said first source of fixed potential through a fixed impedance, each of said switching means being responsive to a respective applied address signal for establishing a low impedance circuit from its respective memory elements to said first source of fixed potential, the establishing of said low impedance circuit causing the isolation diodes of the respective memory elements to be conductively biased independent of the operating voltage states of the tunnel diodes associated therewith, the conductive biasing of an isolation diode by its respective switching means selecting the memory element associated with the conductively biased isolation diode as a memory element to have a binary digit written into or read therefrom at a first or a second preselected time interval, respectively;

a source of predetermined fixed maintaining current, said maintaining current being of a magnitude not exceeding the peak current magnitude of said tunnel diodes and greater than the minimum valley current magnitude of said tunnel diodes;

a plurality of memory maintaining and clearing means each interconnecting said source of maintaining current and the respective memory elements of an individual digital data word, each memory maintaining means normally applying said maintaining current to its respective memory elements to maintain the voltage states of the tunnel diodes associated therewith, each of said maintaining and clearing means being operable at preselected times for inhibiting the flow of said maintaining current through its associated memory elements to set the associated tunnel diodes to their low operating voltage state at the beginning of said first preselected time interval;

a source of predetermined substantially constant write current, said write current exceeding the peak current magnitude of said tunnel diodes, said source including a second resistor having a first and a second terminal and having an impedance value large compared to the impedance of a tunnel diode, said second resistor being coupled by said first terminal to a source of substantially constant voltage for generating, in cooperation with said voltage source, said predetermined write current;

a write means interconnecting said source of write current and all of said plurality of memory elements, said write means receiving an applied bilevel input signal having a first and a second level representing the binary "1" or "0" value, respectively, said write means being responsive to the applied bilevel input signal at its binary "1" value for applying said write current to a preselected memory element and through said isolation diode and said tunnel diode thereof to establish the high voltage operating state therein during said first preselected time interval;

a source of predetermined constant read current, said source including a third resistor having a first and a second terminal and having an impedance value large compared to the impedance of a tunnel diode, said third resistor being coupled by said first terminal to said source of substantially constant voltage for generating, in cooperation with said voltage source, a predetermined read current not exceeding the peak current magnitude of said tunnel diodes;

a read means interconnecting said source of read current and all of said plurality of memory elements, connection to each of said memory elements being made at said first electrode of said isolation diode, said read means being operable in response to a read command signal for applying said read current to a preselected memory element, during said second preselected time interval, said read current being applied to said preselected memory element at said first electrode of said isolation diode conductively biasing said isolation diode independent of the operating voltage state of its associated tunnel diode, said read current causing said preselected memory element to produce at said first electrode of said conductively biased isolation diode a bilevel voltage response signal corresponding to and substantially following the high or low operating voltage state of the associated tunnel diode representing said first or second binary digit stored therein, respectively; and an amplifier means coupled to all of said plurality of memory elements, connection to each of said memory elements being made at said first electrode of said isolation diode, said amplifier means being responsive to said voltage response signal at its high level for producing an output signal in representation thereof.

11. In a tunnel diode memory system having a plurality of tunnel diode memory elements arranged in memory element groups, addressing apparatus for selecting a predetermined one memory element to read a binary digit value therefrom, each memory element employing a tunnel diode for storing a binary first or second digit value as a high or a low tunnel diode operating voltage state, respectively, and an isolation diode connected in series with the tunnel diode, said addressing apparatus comprising:

a first means for selecting a predetermined number of the tunnel diode memory element groups; and a second means for selectively applying to one group of tunnel diode memory elements of said predetermined number of tunnel diode memory element groups, during a preselected time interval, a predetermined read current, the memory elements of said one group conducting said read current therethrough and having the isolation diodes thereof rendered conductive independent of the operating voltage states of their respective tunnel diodes to produce, voltage responsive signals corresponding to and substanitally following said operating voltage states of their respective tunnel diodes.

References Cited

UNITED STATES PATENTS

| | | | |
|---|---|---|---|
| 3,107,345 | 10/1963 | Gruodis | 340—173 |
| 3,114,846 | 12/1963 | Pressman | 307—88.5 |
| 3,198,958 | 8/1965 | Nissim | 307—286 X |
| 3,210,731 | 10/1965 | James et al. | 340—174 |
| 3,229,266 | 1/1966 | Rajchman | 340—174 |
| 3,300,624 | 1/1967 | Bézaguet et al. | 307—322 X |

OTHER REFERENCES

Chapman, G. B.; Thompson, P. M.: A Fast-Word Organized Tunnel-Diode Memory Using Voltage-Mode Selection in Digest of Technical Papers, 1961 International Solid State Circuits Conference, pp. 40–41.

TERRELL W. FEARS, *Primary Examiner.*

J. F. BREIMAYER, *Assistant Examiner.*

U.S. Cl. X.R.

307—322; 340—166